United States Patent
Noirie et al.

(10) Patent No.: US 7,385,968 B2
(45) Date of Patent: Jun. 10, 2008

(54) PACKET SWITCHING SYSTEM FOR A COMMUNICATION NETWORK NODE

(75) Inventors: Ludovic Noirie, Nozay (FR); Silvio Cucchi, Gaggiano (IT); Georg Post, La Ville du Bois (FR)

(73) Assignee: Alcatel, Paris (FR)

( * ) Notice: Subject to any disclaimer, the term of this patent is extended or adjusted under 35 U.S.C. 154(b) by 617 days.

(21) Appl. No.: 11/017,935

(22) Filed: Dec. 22, 2004

(65) Prior Publication Data

US 2005/0135350 A1 Jun. 23, 2005

(30) Foreign Application Priority Data

Dec. 23, 2003 (FR) .................................. 03 15222

(51) Int. Cl.
*H04L 12/54* (2006.01)
(52) U.S. Cl. ...................... 370/360; 370/412; 370/474
(58) Field of Classification Search ................ 370/229, 370/230, 230.1, 231, 235, 252, 412–421, 370/428, 429, 360–364, 381–383, 386, 474, 370/476
See application file for complete search history.

(56) References Cited

U.S. PATENT DOCUMENTS

| | | | |
|---|---|---|---|
| 5,513,174 A | | 4/1996 | Punj |
| 6,072,772 A | * | 6/2000 | Charny et al. ............... 370/229 |
| 6,665,495 B1 | | 12/2003 | Aicklen et al. |
| 7,126,959 B2 | * | 10/2006 | Van Asten et al. .......... 370/429 |
| 7,154,885 B2 | * | 12/2006 | Nong .......................... 370/380 |
| 2003/0137975 A1 | | 7/2003 | Song et al. |

FOREIGN PATENT DOCUMENTS

WO WO 01/69834 A1 9/2001

* cited by examiner

*Primary Examiner*—Wing Chan
*Assistant Examiner*—Duc Duong
(74) *Attorney, Agent, or Firm*—Sughrue Mion, PLLC

(57) ABSTRACT

The switching system includes input modules (IM1, IM2, IMi, IMn) each connected to a switching matrix (1) and to a corresponding controller (2). Each input module (IMi) organizes packets that it receives into digital data blocks with a fixed size, and makes transfers of these blocks by successive cycles to the matrix (1). Each of these blocks is organized into groups of digital data, these groups having corresponding modifiable sizes and being stored according to a predetermined order and associated with the corresponding output ports (OP1, OP2, OPj, OPn) in the system. Each of these groups is formed of packets to be sent to a single corresponding output port. Any block transfer to the matrix (1) is accompanied by transmission of information representative of the corresponding sizes of the groups of the transferred block to the said controller (2), and the groups of each transferred block are switched to their corresponding destination output ports as a function of this information representing the sizes. This system makes it possible to satisfy service quality criteria applicable to switched packets, while limiting the quantity of data to be exchanged between the input modules and the controller. To be applied to telecommunication networks, particularly multiservice networks.

6 Claims, 3 Drawing Sheets

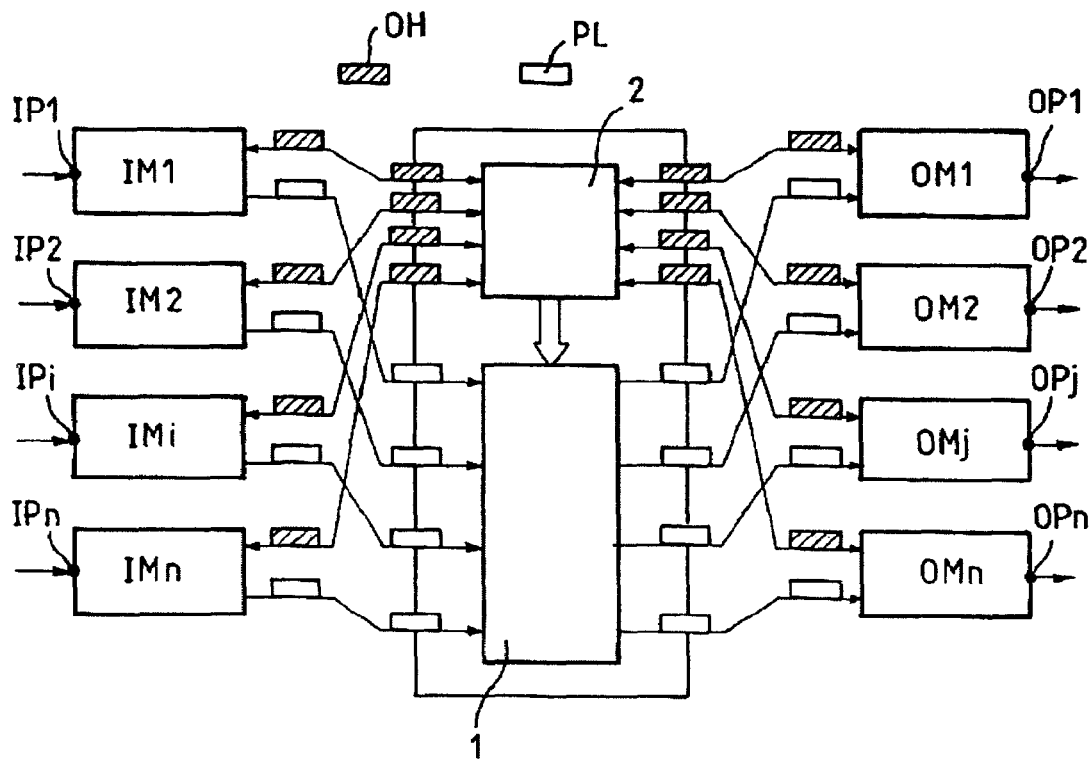
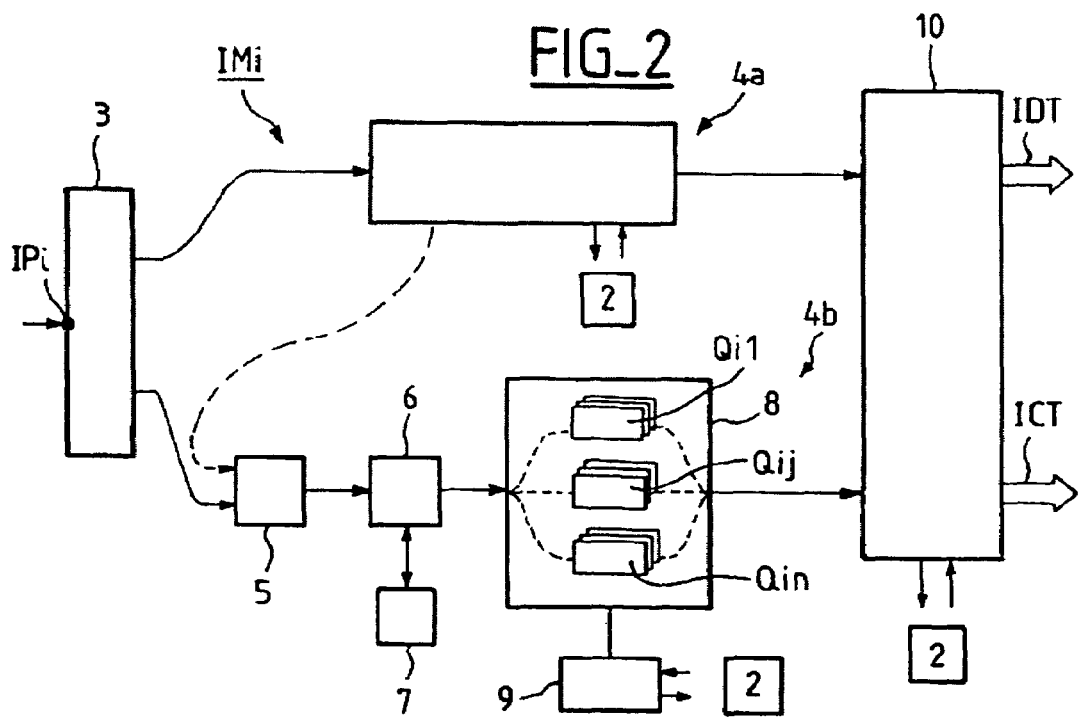

FIG_3
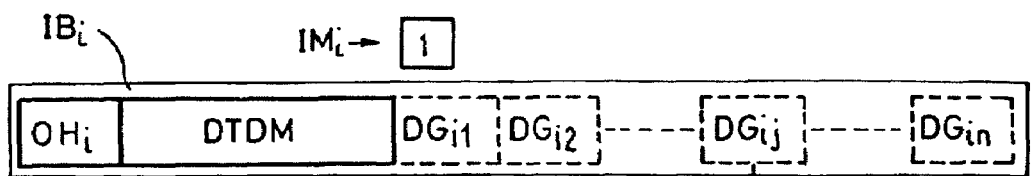
FIG_4
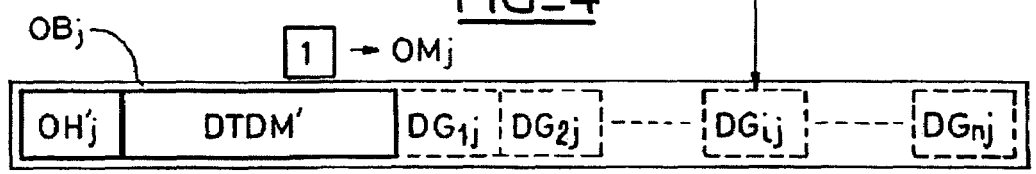
FIG_6
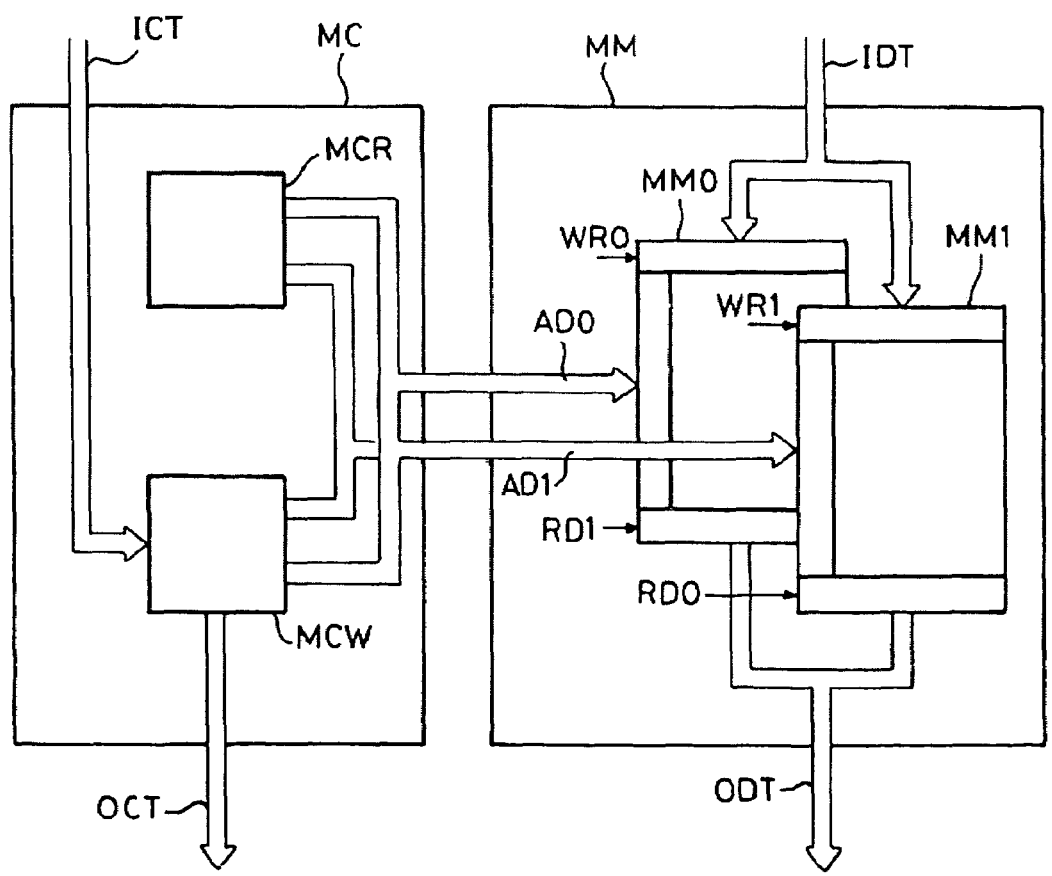

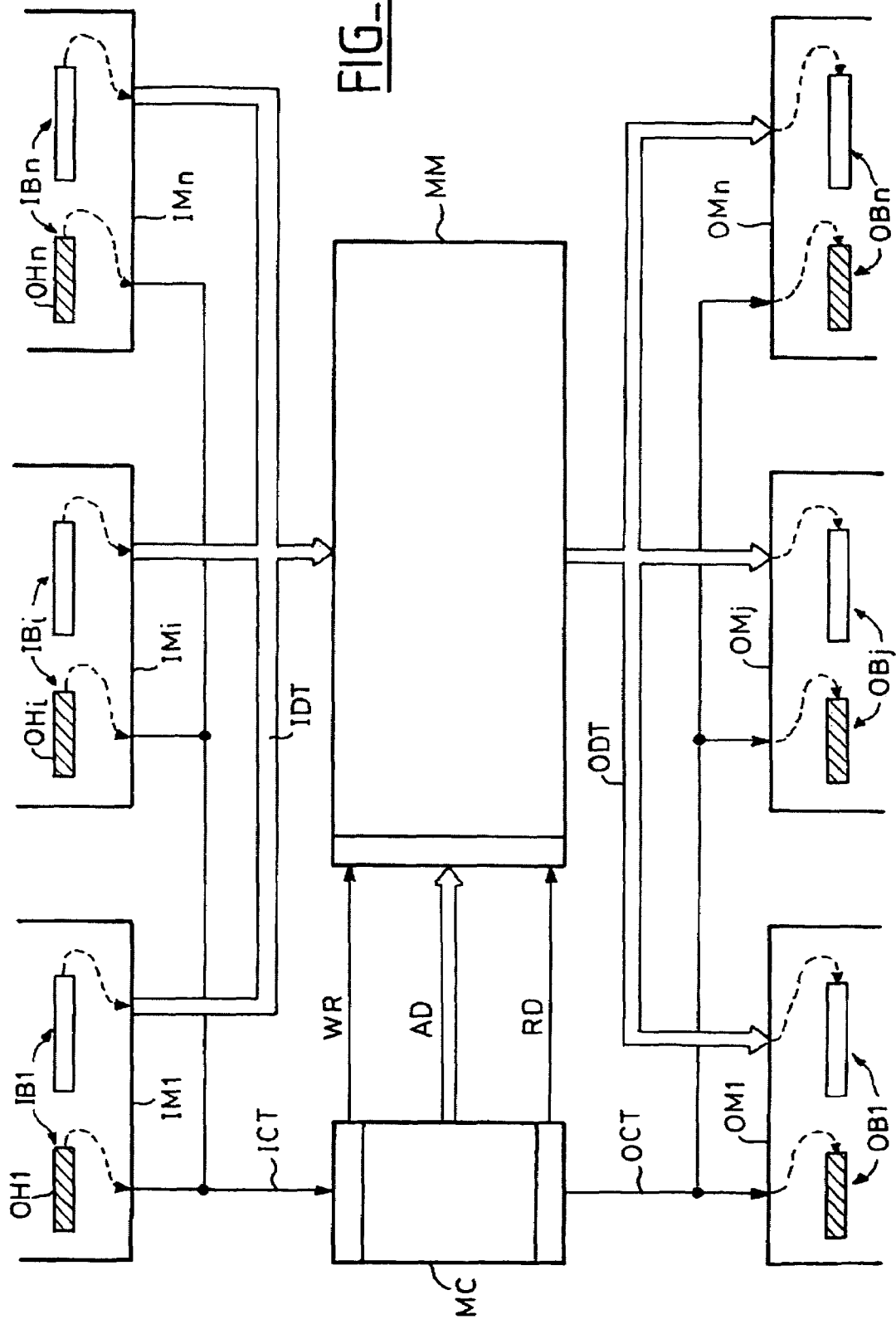
FIG_5

PACKET SWITCHING SYSTEM FOR A COMMUNICATION NETWORK NODE

The invention relates to the domain of telecommunication networks and switching systems used in network nodes.

The invention is more particularly applicable to switching systems capable of processing data organized in packets (packet switching). It also relates to switching systems called "multiservice" systems, in other words systems capable of switching packets, and also of processing data organized in other transmission formats (circuit switching), typically data organized in time division multiplexing (TDM) such as systems conforming with the SDH or SONET protocols or the ODU ("Optical Data Unit") protocol.

In this description, the term "packet" denotes everything related to a data set that includes information data to be transmitted (payload) and auxiliary data for example contained in a packet header, in a predetermined format. In particular, the header contains an indication of the packet destination and generally a service quality class. The indication may be an explicit destination address or a "label" representing this destination. Some of the most frequently used packet formats include the IP (Internet Protocol), MPLS or Ethernet packets that have a variable size and ATM cells that have a fixed size.

Remember that a network comprises several nodes connected to each other through transmission links. A node is often connected to several other nodes and then incorporates routing functions to selectively switch data carried by signals received from input side links to other output side links as a function of the corresponding destinations of the data. Some nodes have access functions through which data can be introduced into the network and/or extracted from the network.

A node is equipped with a switch, used to make a routing function. A switching system comprises firstly several input ports connected through input side links to user station transmitters or other nodes, and secondly several output ports connected through output side links to receivers on other user stations or other nodes. In general, the function of the switching system is to switch data flows received through its various input ports selectively as a function of their corresponding destinations, to output ports assigned to these destinations.

One essential role of a switching system is conflict management, in other words permanent control of data switching such that several received data that are to be sent to a single output port are sent to this port at different times. The performance of the system is evaluated by its pass-band, in other words the total flow of binary data that it can switch on average without data losses.

FIG. 1 diagrammatically shows a typical structure of a switching system. This system comprises a switching matrix 1 controlled by a controller 2, several input modules IM1, IM2, IMi, IMn and several output modules OM1, OM2, OMj, OMn. The input modules are connected to input side links through input ports IP1, IP2, IPi, Ipn respectively, and the output modules are connected to output side links through output ports OP1, OP2, OPj, Opn respectively. The input and output modules cooperate with the matrix 1 and the controller 2 that collect the central functions of the system.

Data to be switched and received through the input ports IPi are transmitted to the matrix through input modules IMi and as a function of commands received from the controller 2, the matrix makes selective switching of these data to output ports OPj through output modules OMj. Each input module IMi or output module OMj also communicates with the controller 2 to exchange control signals and information useful for smooth execution of selective switching.

More precisely, each input module IMi performs a physical interface role with the associated input side link and comprises means of memorizing and processing received data, these means being designed to temporarily store these data, for example in the case of packets forming and managing queues. If there are several service quality classes in the network, several queues could be provided assigned to each of these classes.

Queue management consists firstly of continuously filling these queues with new received data, and secondly extracting data authorized for transfer to the matrix, from these queues. To achieve this, each input module dialogs with a scheduler forming part of the controller 2 according to the general scheme described below. At successive instants, each input module sends requests to the scheduler, informing it of the filling state of its queues. Depending on waiting requests received from all input modules, the scheduler determines data that each queue will be authorized to transfer to the matrix, as a function of predefined criteria, and then informs input modules in the form of grant messages. As a function of the grant messages that it receives, each input module updates its queues performing corresponding data transfers towards the switching matrix.

So that the matrix can switch the data thus transferred, the matrix controller may in particular know the output ports to which these transferred data have to be switched to by the matrix.

If the data are in the form of packets, the switching information is obtained starting from destinations contained in the packet headers and as a function of routing information loaded beforehand into a routing table. In conventional switching systems, the input modules are made responsible for producing this switching information and transmitting it to the controller at the same time as the associated packets are transferred to the matrix. The controller then takes account of the switching information associated with each packet so as to be able to switch it individually accordingly.

According to this procedure, switching is done with optimum granularity to respect service quality constraints. Apart from the condition of not simultaneously selecting packets in conflict, the different criteria used to select packets to be extracted from queues depend particularly on the order of arrival of packets and their service quality classes. With a packet size granularity, these criteria are applicable to specific cases for each packet and in a precise order of acceptance.

On the other hand, this method obliges the controller to process switching information associated with each packet to be switched. Therefore the quantity of control data to be taken into account is relatively high compared with the quantity of "useful" (payload) switched information data. These control data are usually referred to by the term overhead. This aspect is represented in FIG. 1, in which the payload and the overhead are symbolized by white rectangles PL and cross-hatched rectangles OH respectively.

A method for limiting the overhead is to design a process that groups several packets addressed to a single output port in each input module before transferring them to the matrix by complete blocks. Thus, a single item of switching information is necessary for all packets in a single block. This type of packet block is usually denoted by the term burst.

The following method can be used to apply this principle to a switching system. The first step is to define a fixed size of data block, this size (defined by a fixed number of bytes) being chosen to be larger than the maximum packet size, for example of the order of about ten or twelve thousand bytes. Data transfers from an input module to the matrix are made at a given constant rate, and this fixed block size means that constant switching cycle durations can also be defined. The cycle duration is typically equal to a block transfer time.

Each input module is also organized so as to form several queues organized both by output ports and by service quality classes. Thus, each of these queues contains queued packets addressed to a given output port and with a given service quality class.

Furthermore, a data structure (or frame) of the same size as the block and that may be no more than a header field with a fixed size followed by another field with a fixed size reserved for packets. Each input module is then designed to form data blocks conform with the predefined structure, in other words a header identifying the queue and therefore the destination port concerned, and packets or part of packets of this queue, from packets in each of its queues.

Each input module sends requests to the scheduler at the same rate as the cycle switching time and as a function of specific criteria related to the statuses of queues (filling threshold, waiting time).

In each cycle, the scheduler performs an algorithm to select queues for which the associated data blocks are authorized to be transferred during a single later cycle to the matrix, as a function of all requests made in parallel from all input modules. There are various possible criteria, but this selection must satisfy at least these conditions: only queues associated with different output ports and belonging to different input modules can be selected for transfer during a single cycle. The scheduler sends grant messages to input modules identifying corresponding blocks to be transferred. The input modules send data blocks for the selected queues in response to these grant messages.

Compared with the conventional process for packet transfers each accompanied by the associated switching information, this solution reduces the overhead proportionally to the average number of packets contained in blocks.

However, it does have the disadvantage that the algorithm may select queues in which the filling sizes (in number of bytes) are less than the predefined block size. Considering the cyclic nature of operation, the corresponding transferred blocks will then only be partially filled with packets. The result is that the matrix capacity, in terms of passband, is then under used. This situation is not unusual and typically occurs when the queue of a very high priority service quality class contains a very small average number of packets. To respect the corresponding priority rule, the algorithm usually has to select this queue without waiting for it to be sufficiently full so that blocks completely filled with packets can be built up.

One purpose of the invention is to propose a switching system that does not have the disadvantages of the systems mentioned above.

More precisely, the purpose of the invention is a switching system for a communication network node, comprising several input modules each connected to a switching matrix and to a controller controlling the said matrix, the said system being capable of selectively switching flows of data packets received by the said input modules, as a function of their corresponding destinations, to destination output ports, each input module comprising means of processing the received packets, these means being designed to organize these packets into digital data blocks, each of these blocks having a fixed size and to make transfers of these blocks by successive cycles to the matrix, characterized in that each of these blocks is organized into groups of digital data, these groups being stored according to a predetermined order and each associated with the said output ports, each of these groups being formed of digital data belonging to one or several packets to be sent to the said associated output port, and in that the said groups have corresponding modifiable sizes, in that any block transfer to the matrix is accompanied by transmission of information representative of the corresponding sizes of the said groups of the transferred block to the said controller, and in that the groups of each transferred block are switched to their corresponding destination output ports, these output ports being identified using the said information representative of the size of each of the said transferred block groups.

The advantage of this solution is that the corresponding sizes of groups can be optimized for each transfer cycle so as to optimize block filling while respecting switching priority criteria that have to be applied to specific packets. Furthermore, the overhead is limited to the necessary quantity of information to describe the sizes of groups in each transferred block. Since the number of groups per block corresponds to the number of output ports, and the number of blocks transmitted per cycle corresponds to the number of input ports, the quantity of overhead information per cycle will therefore be proportional to the product of these two port numbers, independently of the total number of packets to be switched.

According to one particular embodiment, each of the said input modules being capable of creating and managing queues of received packets to be switched, each input module transmits requests comprising status information representing waiting conditions of packets in the said queues, to a scheduler. The scheduler determines the corresponding sizes of groups of blocks to be organized in the corresponding said input modules as a function of requests received from all input modules, and the scheduler sends grant messages indicating the said corresponding group sizes, to the input modules.

According to another aspect, the said output ports are connected to the matrix through corresponding associated output modules. The groups of digital data received by the matrix during a single cycle are selectively transferred during a subsequent cycle from the matrix to the output modules associated with the corresponding destination output ports, the said group transfers to a given output module being made by successive cycles, and during each cycle, in a predetermined order as a function of the input modules from which the said groups were derived. Furthermore, any transfer of groups to a given output module during a cycle is accompanied by transmission of information representing the corresponding sizes of the said transferred groups, to this output module.

Advantageously, the switching system may be adapted to take account of control packets used for management of network nodes. According to this other aspect of the invention, the said network being designed to enable exchanges of control information between nodes in the form of control packets, the said processing means are designed to receive the said control packets and to organize the said blocks into groups of digital data possibly belonging to packets addressed to output ports, or to control packets, these groups being stored in a predetermined order.

The invention also relates to a multiservice switching system in which the matrix can execute packet switching and time multiplexing channel switching at the same time. Another purpose of the invention is a switching system capable of switching time multiplexing data organized in frames according to a fixed format. The said processing means are then designed to delimit a field reserved for the said time multiplexing data in the said blocks, this reserved field being in a fixed position in the said blocks and having a fixed size, and modifiable at the initiative of a network manager.

According to another aspect, the said frame of the time multiplexing comprising a sequence of fields reserved for interlaced time channels, the data in successive fields reserved for this time channel being planned to be transmitted at the rate of a given nominal period, the duration of the said block transfer cycles is equal to an integer multiple of the said period.

This arrangement is applicable to the SDH or SONET format, and has the advantage of simplifying the sequencing of processing dealing with time multiplexing data.

Other aspects and advantages of the invention will become clear from the following description with reference to the figures.

FIG. 1 described above diagrammatically mentions an example of a switching system in which the invention can be used.

FIG. 2 diagrammatically shows an input module to the switching system.

FIGS. 3 and 4 show structures of data blocks composed according to the invention, in the input modules and on the input side of the output modules of the switching system respectively.

FIG. 5 shows a switching matrix capable of using the invention.

FIG. 6 shows an example of a preferred embodiment of the switching matrix.

FIG. 2 shows an input module designed for a multiservice switching system. In this case, the module IMi comprises a first channel 4a dedicated to processing of time multiplexing, called the TDM channel, and a second channel 4b for processing packets, called the packets channel. The two channels 4a, 4b are each connected on the input side to an input interface circuit 3 and on the output side to an output interface circuit 10. It should be noted that it would also be possible to have input modules comprising only channel 4a (purely TDM input module) and also input modules comprising only channel 4b (purely packet input module).

The input interface circuit 3 receives signals carried by an input side link, through an associated input port Ipi. This circuit mainly forms a physical interface with the connection, for example to convert received signals into electrical form if necessary, to format them and to convert them to digital form. The circuit 3 also integrates the switching function to the TDM channel or the packets channel as a function of a network management command that determines the intended format type of received data (TDM or packets).

The TDM channel is composed essentially of a conventional type of TDM processor that will perform time demultiplexing operations and data transfers to matrix 1 in response to dialogs exchanged with the controller 2.

The packets channel is composed of a packet reformatting stage 5, followed by a sorting stage 6 and then a queues memory 8.

The classification stage 6 takes account of destination indications and service quality classes contained in packet headers. The stage 6 cooperates with a routing table 9 to determine the output ports to which received packets are to be switched, as a function of these destination indications and routing information loaded in advance in table 9.

Packet queues Qi1, Qij, Qin are built up in the memory 8, depending on these elements, and under the control of a queue management unit 9. A queue will be composed of packets in the same quality class and addressed to a single output port. The management unit 9 updates queues firstly as a function of new packets received, and secondly as a function of grants for transfers of queued packets to the matrix.

These grants originate from a scheduler in the controller 2 with which the unit 9 dialogs as follows. The unit 9 sends requests containing status information representing waiting conditions of packets in the queues, to the scheduler. The scheduler determines the size (in terms of the number of bytes or binary words that can be addressed in a single operation) of the memory space of the queue to be transferred, as a function of requests received from all input modules, for each queue in each input module. The scheduler then sends grant messages indicating these sizes to the input modules.

The scheduler determines these sizes by executing a selection algorithm that is intended firstly to satisfy service quality criteria by assigning appropriate sizes to the highest priority queues in priority.

But the organization by groups also means that an algorithm can be designed with the purpose of filling blocks to be transferred to the maximum within the limit of the sizes allocated to the packets, these allocated sizes possibly depending on the inputs and outputs considered, and thus optimizing use of the pass-band. For example, the possibility of assigning sizes that do not correspond to complete packets contributes to this objective. Similarly, the algorithm can take account of effective queue filling sizes and never assigns an authorized queue size that is greater than the actual queue filling size.

Furthermore, the algorithm can be designed to allocate a certain "equity" in how queued packets are taken into account in the various queues in the various input modules. For example, determination of sizes may systematically impose a minimum size assigned to the first queues taken into account by the algorithm and switching the order of acceptance of input queues and input modules, from one cycle to the next.

According to the invention, the management unit 9 and the output interface 10 are designed to organize packets thus granted into digital data blocks, each of these blocks having a fixed size, and to transfer them by successive cycles to the matrix 1.

FIG. 3 more specifically shows one example of such a block IBi format formed by the input module IMi. Each of these blocks is organized into digital data groups DGi1, DGi2, DGij, DGin. These groups are stored in a predetermined order, and are associated with output ports OP1, OP2, OPj, Opn respectively, and each of these groups is formed from digital data belonging to one or several packets addressed to the associated output port. The corresponding group sizes, which can be modified from one cycle to another, are determined by the scheduler mentioned above.

The example described corresponds to the case of a multiservice switching system, in other words capable of switching TDM time multiplexing data. This type of multiplexing is composed of data organized by frames according to a fixed format, for example SDH or SONET. In this case, when TDM data are transferred to one of the input modules, they are processed through the TDM channel 4a, the processor of which determines the size that will be reserved for these data, for each switching cycle. This size takes account of indications provided by a network manager ("control plane") and may be modified at its initiative. This reserved size is represented by the DTDM field in the block IBi format shown in FIG. 3. By setting this reserved field at a fixed position in the blocks, and since its size is known, rules for organization and processing of groups reserved for packets actually remain unchanged, the only difference is the possible sizes of the groups.

It should be noted that the system may also switch packets transported by time multiplexing. All that is necessary to achieve this is to allow a possibility for a connection between TDM channel 4a and the packets reformatting stage 5, as shown diagrammatically by an arrow in dashed lines in FIG. 2.

In each cycle, the block thus composed from queues passes through the output interface 10 and is transferred to the matrix 1 through the IDT connection, under the control of the controller 2.

The particular organization of TDM frames has to be taken into account in the case of a multiservice switching system. A TDM frame comprises a sequence of fields reserved for interlaced time channels, and data of successive fields reserved for the same time channel are designed so that they can be transmitted at the same rate as a given nominal period. Processing of TDM data will then be facilitated if the duration of block transfer cycles is equal to an integer multiple of this period.

Note that the block transfer can begin before the block is fully composed. Furthermore, there is no need for a packet to be entirely contained within a single group. A part of a packet may be contained in one group of a block and the remainder of the packet may be contained in one or more groups of blocks transferred in subsequent cycles.

The management unit 9 and the output interface 10 are also designed to build up information representing the corresponding sizes of groups of each block built up. Any block transfer to the matrix is then accompanied by transmission of this information to the controller, together with an indication of the size of the field reserved for TDM data if this case is required.

This information about sizes may be the sizes themselves of different fields, or information related to these sizes such as the relative positions of the beginning and end of fields in the block.

For example, information about sizes is contained in another fixed size reserved field provided in the block format. This case is shown in FIG. 3 by the OHi field. Another possibility would be to transfer information about sizes through a control link independent of the block transfer link.

Thus, as a function of the information representing the size of each group of blocks transferred during a single cycle by the different input modules, the controller is capable of controlling the matrix to switch groups in each transferred block to their corresponding destination output ports OP1, OP2, OPj, OPn.

There are several possible means of achieving this. According to one preferred embodiment, the output ports are connected to the matrix 1 through output modules OM1, OM2, OMj, OMn respectively that cooperate with the matrix as follows.

The digital data groups DGij received by the matrix during one cycle are transferred in a subsequent cycle (in principle the next cycle), selectively from the matrix to the output modules associated with the corresponding destination output ports. Transfers of groups DG1j, DG2j, DGij, DGnj to a given output module OMj are also made by successive cycles, at the same rate as successive block transfer cycles between the input modules and the matrix. During each cycle, groups are transferred in a predetermined order that depends on the input modules from which groups are derived. Finally, during a cycle, every transfer of groups to an output module is accompanied by transmission of information representing the corresponding sizes of the said transferred groups to this output module.

This transfer organization is shown in FIG. 4 by a format of a block OBj representing groups DG1j, DG2j, DGij, DGnj addressed to the output module OMj. For example, information about sizes is contained in a fixed size reserved field included in the block format. This case is shown in FIG. 4 by field OH'j. Another possibility would be to transfer information about sizes through a control link OCT independent of the group transfer link ODT.

If TDM data are included, they will be switched by the same switching system, using conventional means, and placed selectively in a field reserved for blocks addressed to modules and output ports that have to transfer these TDM data.

Note that the formats chosen for blocks IBi and OBj determine the total sizes specifically allocated to packets, and therefore to groups DGij, for each switching cycle, at input and output modules. Obviously, this is one of the elements taken into account by the scheduler to determine the corresponding sizes of the groups DGij, such that the total size of groups in a single block is equal to not more than the size allocated to packets in the block concerned, for each input and output module.

Depending on these elements, each output module is capable of rebuilding the packets, and after usual formatting, sending them in the form of a signal through the associated output port. Those skilled in the art will be capable of producing such an output module, and it will not be described in any further detail.

FIG. 5 shows a switching matrix adapted to implementation of packet switching according to the invention that can also be used for conventional switching of TDM circuits. Essentially, it comprises a memory MM associated with a control and addressing unit MC.

One input to the memory is connected to the different input modules IM1, IMi, IMn through an input bus IDT. This bus is assigned to transfers of groups to be loaded in the memory. One output from the memory is connected to the different output modules OM1, OMj, OMn through an output bus ODT. This bus is assigned to transfers of groups addressed to output modules.

The control and addressing unit MC communicates through control lines ICT and OCT with input and output modules respectively, so as to receive information about sizes of groups transferred to the matrix from the input modules during each cycle, and to forward information about the sizes of the groups transferred to the output modules.

Packet switching operations are controlled by the unit MC that starts storage of data words in blocks composed by the input modules, in the memory, in successive cycles, and then reading these words by selective addressing and corresponding validations of their writing in the output modules.

The memory is controlled in write WR during each storage cycle, and receives predetermined successive addresses from the unit MC, synchronized at the same rate as transfers of data words in the transferred groups. During this cycle, the unit MC receives information about group sizes and produces pointer type addresses associated with the received groups accordingly. These addresses that depend on the corresponding destinations of groups can be calculated using information about successive group sizes.

In the next cycle, the memory is controlled in read RD so as to be able to switch the data words thus stored to the destination output modules, and it receives the successive addresses corresponding to the pointers generated during the previous cycle. The words read are placed successively on the output bus ODT and the destination output modules are controlled selectively in write accordingly.

The memory will advantageously be organized in two modules so that read and write operations can be carried out simultaneously, to improve performances,. This solution is shown in more detail in FIG. 6.

Each of the two modules MM0 and MM1 has its input and output connected to the IDT and ODT buses respectively and can be addressed and controlled in write and read independently. Since the addressing functions for read MCR and for write MCW can be separated in the unit MC during a first cycle, write WR0 of module MM0 and read RD0 of module MM1 can be controlled at the same time, and then during the next cycle, read RD1 of module MM0 and write WR1 of module MM1 can be controlled at the same time, and so on. The result is that switching operations can be made with no lost time, at the same rate as block transfers.

The same memory is used to store TDM data, to facilitate switching of TDM data. However, a special addressing module will be provided to control data transfers in the conventional manner.

The invention is not limited to the embodiments described above.

In particular, input and output modules may be physically grouped on the same electronic card.

Similarly, production of the controller 2 and particularly its scheduler may be distributed for example by implanting some of their functions on input modules.

The invention claimed is:

1. Switching system for a communication network node, comprising several input modules (IMi, IM2, IMi, IMn) each connected to a switching matrix (1) and to a controller (2) controlling the said matrix (1), the said system being capable of switching flows of data packets received by the said input modules, selectively as a function of their corresponding destinations, to destination output ports (OP1, 0P2, OPj, OPn), each input module (IMi) comprising means (9, 10) for processing received packets, these means (9, 10) being designed to organize these packets into digital data blocks (IBi), each of these blocks having a fixed size, and to make transfers of these blocks to the matrix (1) by successive cycles, characterized in that each of these blocks (IBi) is organized into groups of digital data (DGi1, DGi2, DGij, DGin), these groups being stored according to a predetermined order and each associated with the said output ports, each of these groups being formed of digital data belonging to one or several packets to be sent to the said associated output port, in that the said groups have corresponding modifiable sizes, in that any block transfer to the matrix (1) is accompanied by transmission of information representative of the corresponding sizes of the said groups of the transferred block to the said controller (2), and in that the groups of each transferred block are switched to their corresponding destination output ports, these output ports being identified using the said information representative of the size of each of the said transferred block groups.

2. Switching system according to claim 1, characterized in that each of the said input modules (IM1, IM2, IMi, IMn) being capable of creating and managing queues (Qi1, Qij, Qin) of received packets to be switched, each input module transmits requests comprising status information representing waiting conditions of packets in the said queues to a scheduler, in that the scheduler determines the corresponding sizes of groups of blocks to be organized in the corresponding said input modules as a function of requests received from all input modules, and in that the scheduler sends grant messages indicating the said corresponding group sizes to the input modules.

3. Switching system according to claim 1, characterized in that the said output ports (OP1, 0P2, OPj, OPn) are connected to the matrix (1) through corresponding associated output modules (OM1, 0M2, OMj, OMn), in that the groups of digital data (DGij) received by the matrix during a single cycle are selectively transferred during a subsequent cycle from the matrix to the output modules associated with the corresponding destination output ports, the said group transfers (DG1j, DG2j, DGij, DGnj) to a given output module (OMj) being made by successive cycles, and during each cycle in a predetermined order as a function of the input modules from which the said groups were derived, in that any transfer of groups to a given output module during a cycle is accompanied by transmission of information representing the corresponding sizes of the said transferred groups, to this output module.

4. Switching system according to claim 1, characterized in that the said network being designed to enable exchanges of control information between nodes in the form of control packets, the said processing means (9, 10) are designed to receive the said control packets and to organize the said blocks (IBi) into groups of digital data possibly belonging to packets addressed to output ports, or to control packets, these groups being stored in a predetermined order.

5. Switching system according to claim 1, the said system being capable of switching time multiplexing data organized in frames according to a fixed format, characterized in that the said processing means (4a, 9, 10) are designed to delimit a field (DTDM) reserved for the said time multiplexing data in the said blocks, this reserved field being in a fixed position in the said blocks and having a fixed size, and modifiable at the initiative of a network manager.

6. Switching system according to claim 5, characterized in that the said frame of the time multiplexing comprising a sequence of fields reserved for interlaced time channels, the data in successive fields reserved for a single time channel being planned to be transmitted at the rate of a given nominal period, the duration of the said block transfer cycles is equal to an integer multiple of the said period.

* * * * *